United States Patent
Cahen et al.

(10) Patent No.: US 8,800,433 B2
(45) Date of Patent: Aug. 12, 2014

(54) USED CAPSULE OR POD RECEPTACLE FOR LIQUID FOOD OR BEVERAGE MACHINES

(75) Inventors: Antoine Cahen, Lausanne (CH); Stefan Kaeser, Aarau (CH); Alexandre Kollep, Lutry (CH); Frank Kräuchi, Epautheyres (CH); Peter Möri, Walperswil (CH); Matthieu Ozanne, Chessel (CH)

(73) Assignee: Nestec S.A., Vevey (CH)

( * ) Notice: Subject to any disclaimer, the term of this patent is extended or adjusted under 35 U.S.C. 154(b) by 1036 days.

(21) Appl. No.: 12/747,743

(22) PCT Filed: Dec. 9, 2008

(86) PCT No.: PCT/EP2008/067083
§ 371 (c)(1),
(2), (4) Date: Jun. 11, 2010

(87) PCT Pub. No.: WO2009/074559
PCT Pub. Date: Jun. 18, 2009

(65) Prior Publication Data
US 2010/0251900 A1   Oct. 7, 2010

(30) Foreign Application Priority Data

Dec. 12, 2007 (EP) .................................. 07123009
May 7, 2008 (EP) .................................. 08155753

(51) Int. Cl.
*A47J 31/36* (2006.01)
(52) U.S. Cl.
CPC .......... *A47J 31/3619* (2013.01); *A47J 31/3638* (2013.01)
USPC ........................................ 99/289 R; 99/295
(58) Field of Classification Search
CPC .......................... A47J 31/3619; A47J 31/3638
USPC .......... 99/284, 290, 295, 289 R, 323.1, 323.2
See application file for complete search history.

(56) References Cited

U.S. PATENT DOCUMENTS 2,927,533 A    3/1960   Luehrs
3,218,955 A    11/1965  Lorang ........................... 99/282
(Continued)

FOREIGN PATENT DOCUMENTS

AT    410377       4/2003
CH    682 798      11/1993
(Continued)

OTHER PUBLICATIONS

U.S. Appl. No. 12/747,841, Non-Final Office Action, dated Dec. 18, 2012.
(Continued)

*Primary Examiner* — Brian Jennison
(74) *Attorney, Agent, or Firm* — Winston & Strawn LLP

(57) ABSTRACT

A machine for preparing liquid food or beverage from a beverage or food ingredient contained in a capsule or pod. The machine includes a liquid food or beverage preparation unit arranged to receive capsules or pods for use and evacuate capsules or pods after use; a housing having an opening leading into a seat to which capsules or pods are evacuated from the preparation unit; and a receptacle having a cavity forming a storage space for collecting capsules or pods evacuated to the seat into the receptacle to a level of fill. The receptacle is insertable into the seat for collecting capsules or pods and is removable from the seat for emptying the collected capsules or pods. The preparation machine further comprises a mechanism to inhibit jamming of the receptacle at removal from the seat when the level of fill in the receptacle extends above the opening of the housing.

19 Claims, 5 Drawing Sheets

(56) References Cited

U.S. PATENT DOCUMENTS

| | | | |
|---|---|---|---|
| 3,938,492 A | 2/1976 | Mercer, Jr. | |
| 4,054,085 A | 10/1977 | Tarr | |
| 4,164,306 A | 8/1979 | Perrin | |
| 4,253,385 A | 3/1981 | Illy | 99/281 |
| 4,377,049 A | 3/1983 | Simon et al. | 40/465 |
| 4,389,925 A | 6/1983 | Piana | |
| 4,458,735 A | 7/1984 | Houman | 141/95 |
| 4,554,419 A | 11/1985 | King et al. | 200/5 |
| 4,681,495 A | 7/1987 | Crespin et al. | 411/298 |
| 4,757,753 A | 7/1988 | Pandolfi | |
| 4,767,632 A | 8/1988 | Meier | 426/231 |
| 4,829,888 A | 5/1989 | Webster et al. | |
| 4,892,031 A | 1/1990 | Webster et al. | |
| 4,954,697 A | 9/1990 | Kokubun et al. | 235/381 |
| 5,036,998 A | 8/1991 | Dunn | |
| 5,161,455 A | 11/1992 | Anson et al. | 99/280 |
| 5,193,701 A | 3/1993 | Bush et al. | |
| 5,312,020 A | 5/1994 | Frei | 222/129.1 |
| 5,335,705 A | 8/1994 | Morishita et al. | 141/275 |
| 5,353,692 A | 10/1994 | Reese et al. | 99/289 |
| 5,372,061 A | 12/1994 | Albert et al. | 99/281 |
| 5,375,508 A | 12/1994 | Knepler et al. | 99/290 |
| 5,498,757 A * | 3/1996 | Johnson et al. | 426/520 |
| 5,645,230 A | 7/1997 | Marogna et al. | 241/27 |
| 5,731,981 A | 3/1998 | Simard | 364/465 |
| 5,836,236 A | 11/1998 | Rolfes et al. | 99/290 |
| 5,855,161 A * | 1/1999 | Cortese | 99/289 P |
| 5,890,615 A | 4/1999 | Petras | |
| 5,916,351 A | 6/1999 | Sintchak | |
| 5,927,553 A | 7/1999 | Ford | 222/129.4 |
| 5,959,869 A | 9/1999 | Miller et al. | 364/479.01 |
| 5,992,298 A | 11/1999 | Illy et al. | |
| 6,029,562 A | 2/2000 | Sintchak | 99/275 |
| 6,062,127 A | 5/2000 | Klosinski et al. | 99/303 |
| 6,123,010 A | 9/2000 | Blackstone | 99/284 |
| 6,182,555 B1 | 2/2001 | Scheer et al. | 99/290 |
| 6,213,336 B1 | 4/2001 | Lin | |
| 6,325,312 B1 | 12/2001 | Karkos, Jr. | |
| 6,345,570 B1 * | 2/2002 | Santi | 99/289 R |
| 6,354,341 B1 | 3/2002 | Saveliev et al. | 141/94 |
| 6,582,002 B2 | 6/2003 | Hogan et al. | |
| 6,759,072 B1 | 7/2004 | Gutwein et al. | 426/433 |
| 7,028,603 B1 | 4/2006 | Gremillion et al. | 99/290 |
| 7,093,533 B2 | 8/2006 | Tebo, Jr. et al. | |
| 7,210,401 B1 | 5/2007 | Rolfes et | 99/289 |
| 7,270,050 B2 | 9/2007 | Glucksman et al. | 99/297 |
| 7,279,660 B2 | 10/2007 | Long et al. | 219/441 |
| 7,350,455 B2 | 4/2008 | Vetterli | 99/280 |
| 2002/0185016 A1 * | 12/2002 | Hoffjann et al. | 100/110 |
| 2003/0070555 A1 | 4/2003 | Reyhanloo | 99/282 |
| 2004/0015263 A1 | 1/2004 | Chadwell et al. | 700/216 |
| 2005/0015263 A1 | 1/2005 | Beal et al. | 705/1 |
| 2005/0258186 A1 | 11/2005 | Hart et al. | |
| 2007/0062378 A1 | 3/2007 | Glucksman et al. | |
| 2007/0157820 A1 | 7/2007 | Bunn | 99/275 |
| 2007/0175338 A1 | 8/2007 | Glucksman et al. | |
| 2009/0101021 A1 | 4/2009 | Tonelli et al. | 99/290 |
| 2009/0173235 A1 | 7/2009 | Kollep et al. | 99/279 |
| 2010/0263543 A1 | 10/2010 | Krauchi et al. | 99/280 |
| 2010/0263547 A1 | 10/2010 | Cahen et al. | 99/300 |
| 2010/0263550 A1 | 10/2010 | Cahen et al. | 99/323.1 |
| 2010/0300301 A1 | 12/2010 | Cahen et al. | 99/323.1 |
| 2011/0041698 A1 | 2/2011 | Mori | 99/290 |

FOREIGN PATENT DOCUMENTS

| | | |
|---|---|---|
| CN | 2235252 Y | 9/1996 |
| CN | 1209041 A | 2/1999 |
| CN | 2387836 | 7/2000 |
| CN | 2682954 Y | 3/2005 |
| CN | 1875831 | 12/2006 |
| DE | 44 29 353 | 2/1996 |
| DE | 20 2006 002 124 | 5/2006 |
| DE | 20 2006 019 039 | 4/2007 |
| DE | 102006060748 | 1/2008 |
| EP | 0 549 887 | 7/1993 |
| EP | 0 838 186 | 4/1998 |
| EP | 08155753.0 | 7/2003 |
| EP | 1 440 639 | 7/2004 |
| EP | 1 448 084 | 8/2004 |
| EP | 1 676 509 | 7/2006 |
| EP | 1 707 088 | 10/2006 |
| EP | 1 731 065 | 12/2006 |
| EP | 1772081 A1 | 4/2007 |
| EP | 1 798 457 | 6/2007 |
| EP | 1 859 713 | 11/2007 |
| EP | 08155851.2 | 11/2007 |
| EP | 1 864 598 | 12/2007 |
| EP | 1 867 260 | 12/2007 |
| EP | 1 878 368 | 1/2008 |
| EP | 2 070 454 | 6/2009 |
| FR | 2 440 720 | 11/1979 |
| FR | 2 544 185 A3 | 10/1984 |
| FR | 2 554 185 | 5/1985 |
| FR | 2 624 844 | 6/1989 |
| GB | 2 397 510 | 7/2004 |
| GB | 2 421 423 | 6/2006 |
| JP | 50054990 A | 5/1975 |
| JP | 51135081 U | 11/1976 |
| JP | 52138542 U | 10/1977 |
| JP | 54065788 U | 5/1979 |
| JP | S59174120 A | 10/1984 |
| JP | 61119218 A | 6/1986 |
| JP | H0638880 A2 | 2/1994 |
| JP | 2001222761 A | 8/2001 |
| JP | 2002191505 A | 7/2002 |
| JP | 2004527893 A | 9/2004 |
| JP | 2006341097 A | 12/2006 |
| LU | 85318 | 9/1984 |
| RU | 2294875 C2 | 3/2007 |
| SU | 1797482 A3 | 2/1993 |
| WO | W097/24052 | 7/1997 |
| WO | WO 97/25634 | 7/1997 |
| WO | WO 99/50172 | 10/1999 |
| WO | WO 02/059534 | 8/2002 |
| WO | WO02/070371 A2 | 9/2002 |
| WO | WO 02/097927 | 12/2002 |
| WO | WO02097927 A1 | 12/2002 |
| WO | WO 03039309 | 5/2003 |
| WO | WO 03/075629 | 9/2003 |
| WO | WO 03/093142 A1 | 11/2003 |
| WO | WO 2004/030435 | 4/2004 |
| WO | WO 2004/030438 | 4/2004 |
| WO | WO 2005/099535 | 10/2005 |
| WO | WO 2006/050900 | 5/2006 |
| WO | WO 2006/063645 | 6/2006 |
| WO | WO 2006/082064 | 8/2006 |
| WO | WO 2006/090183 | 8/2006 |
| WO | WO 2006/122916 | 11/2006 |
| WO | WO 2007/003062 | 1/2007 |
| WO | WO 2007/003990 | 1/2007 |
| WO | WO 2007/141334 | 12/2007 |
| WO | WO 2008/046837 | 4/2008 |
| WO | WO 2008/104751 | 9/2008 |
| WO | WO 2008/138710 | 11/2008 |
| WO | WO 2008/138820 | 11/2008 |
| WO | WO 2011/092644 | 8/2011 |

OTHER PUBLICATIONS

U.S. Appl. No. 12/988,295, Restriction Requirement, dated Aug. 16, 2012.

U.S. Appl. No. 12/747,820, Restriction Requirement, dated Feb. 15, 2013.

U.S. Appl. No. 12/747,794, Non-Final Office Action, dated Jan. 30, 2013.

Page 66 of the official Diary of Chile listing CL 3721-08 (corresponding to US 2010/0263543A1) dated Jan. 8, 2010.

Chilean Search Report for CL 3720-08 dated Feb. 7, 2011 (corresponding to US 2010-0263547A1).

CL-2023-07 cited in Chilean Search Report, CL 3720-08 dated Feb. 7, 2011 (corresponding to US 2009-0173235A1).

(56) References Cited

OTHER PUBLICATIONS

International Search Report, PCT/EP2008/067072, mailed Oct. 9, 2009.
International Search Report, PCT/EP2008/067075, mailed Aug. 27, 2009.
International Search Report, PCT/EP2008/067077, mailed Oct. 14, 2009.
International Search Report, PCT/EP2008/067079, mailed Apr. 9, 2009.
International Search Report, PCT/EP2008/067083, mailed Apr. 16, 2009.
European Search Report, Application No. EP 10167803 mailed Aug. 27, 2010.
U.S. Appl. No. 12/747,794, Final Office Action, dated Jun. 6, 2013.
U.S. Appl. No. 12/988,295, Non-Final Office Action, dated May 6, 2013.
P007910120—Kaffeevollautomatern Magnifica II—ESAM 300 B—Mar. 12, 2007.
U.S. Appl. No. 12/747,841, Final Office Action, dated May 13, 2013.
U.S. Appl. No. 12/747,684, Final Office Action, dated Jul. 30, 2013.
U.S. Appl. No. 12/988,295, Final Office Action, dated Jul. 24, 2013.
U.S. Appl. No. 12/747,841, Advisory Action, dated Jul. 26, 2013.
U.S. Appl. No. 12/747,820, Non-Final Office Action, dated Aug. 2, 2013.
U.S. Appl. No. 12/747,684, Advisory Action, dated Nov. 13, 2013.
U.S. Appl. No. 12/988,295, Notice of Allowance, dated Dec. 2, 2013.
U.S. Appl. No. 12/747,820, Final Office Action, dated Dec. 4, 2013.

* cited by examiner

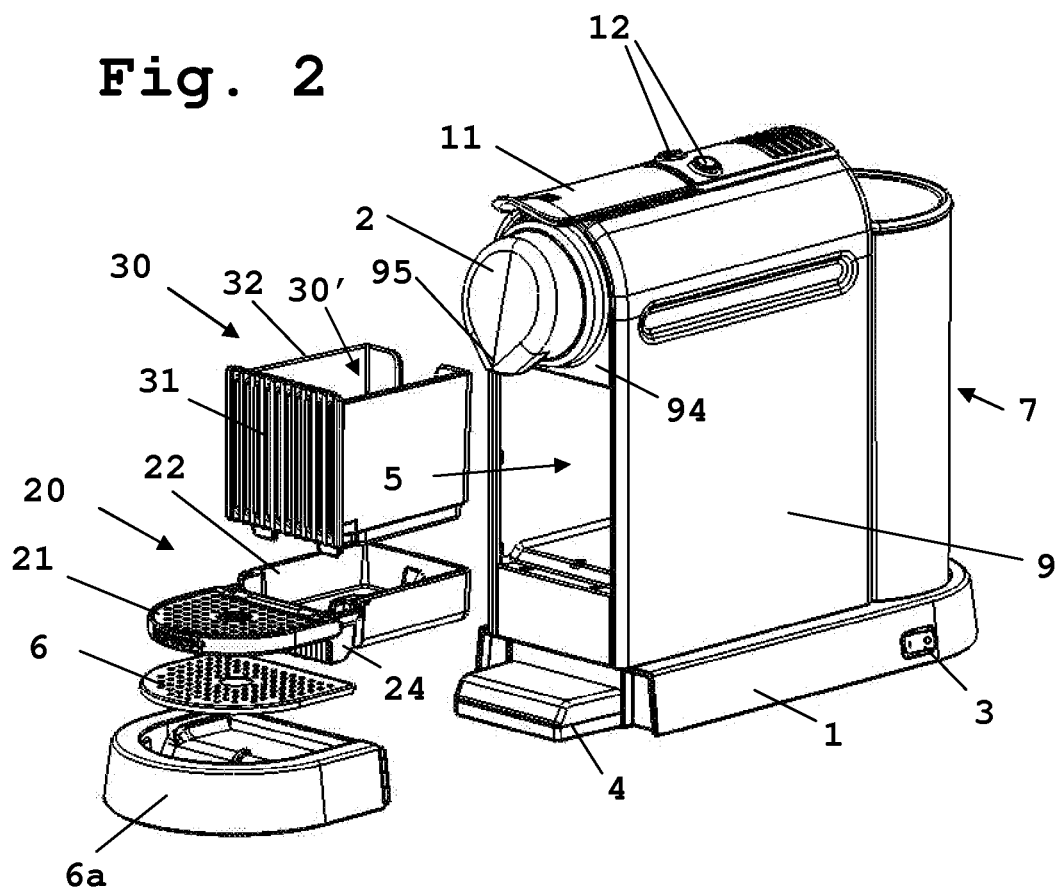
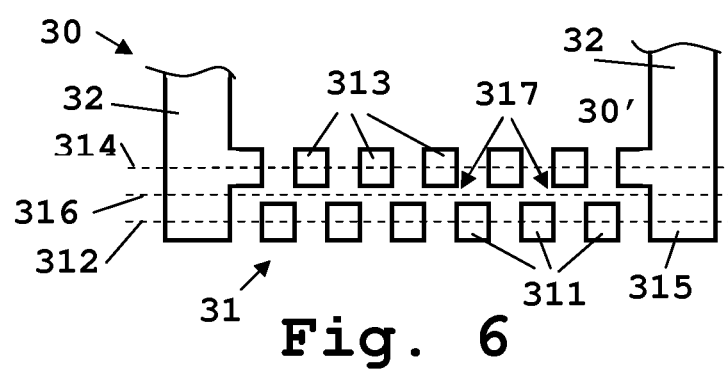

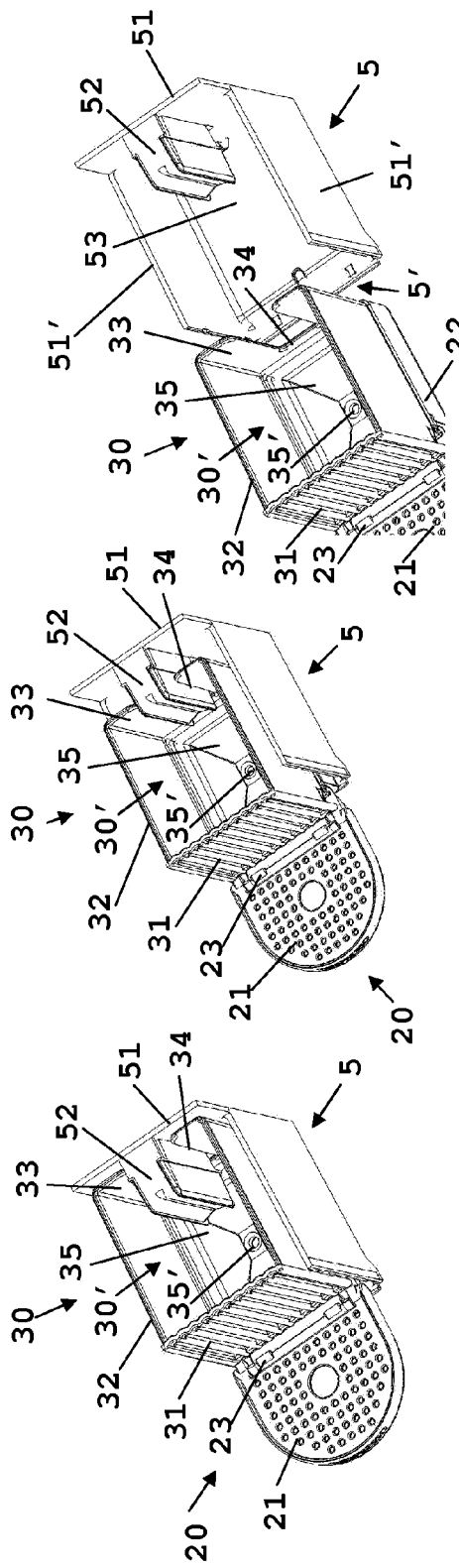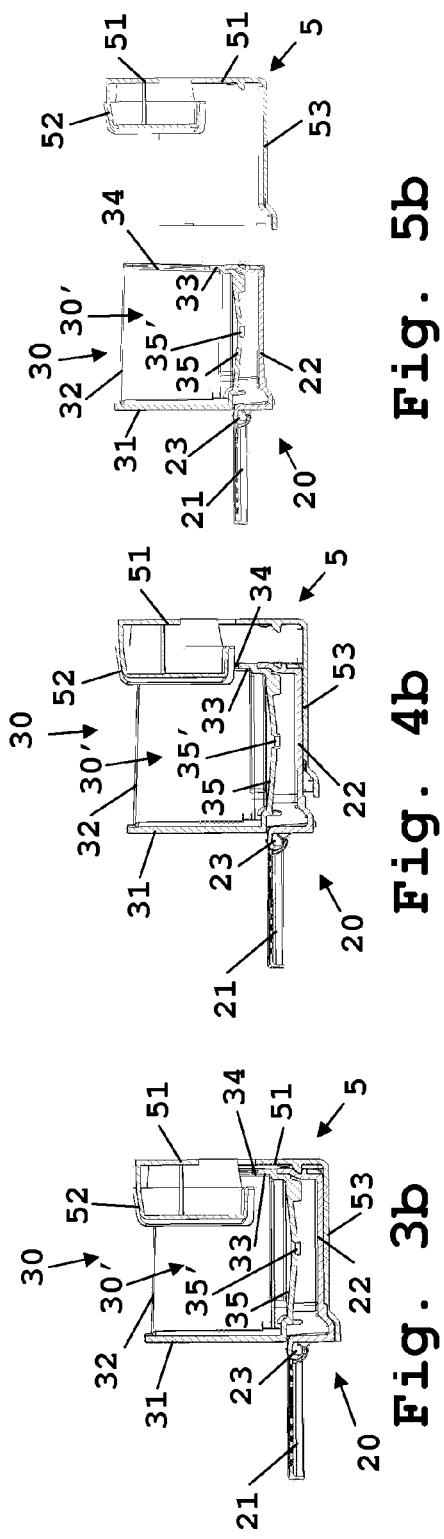

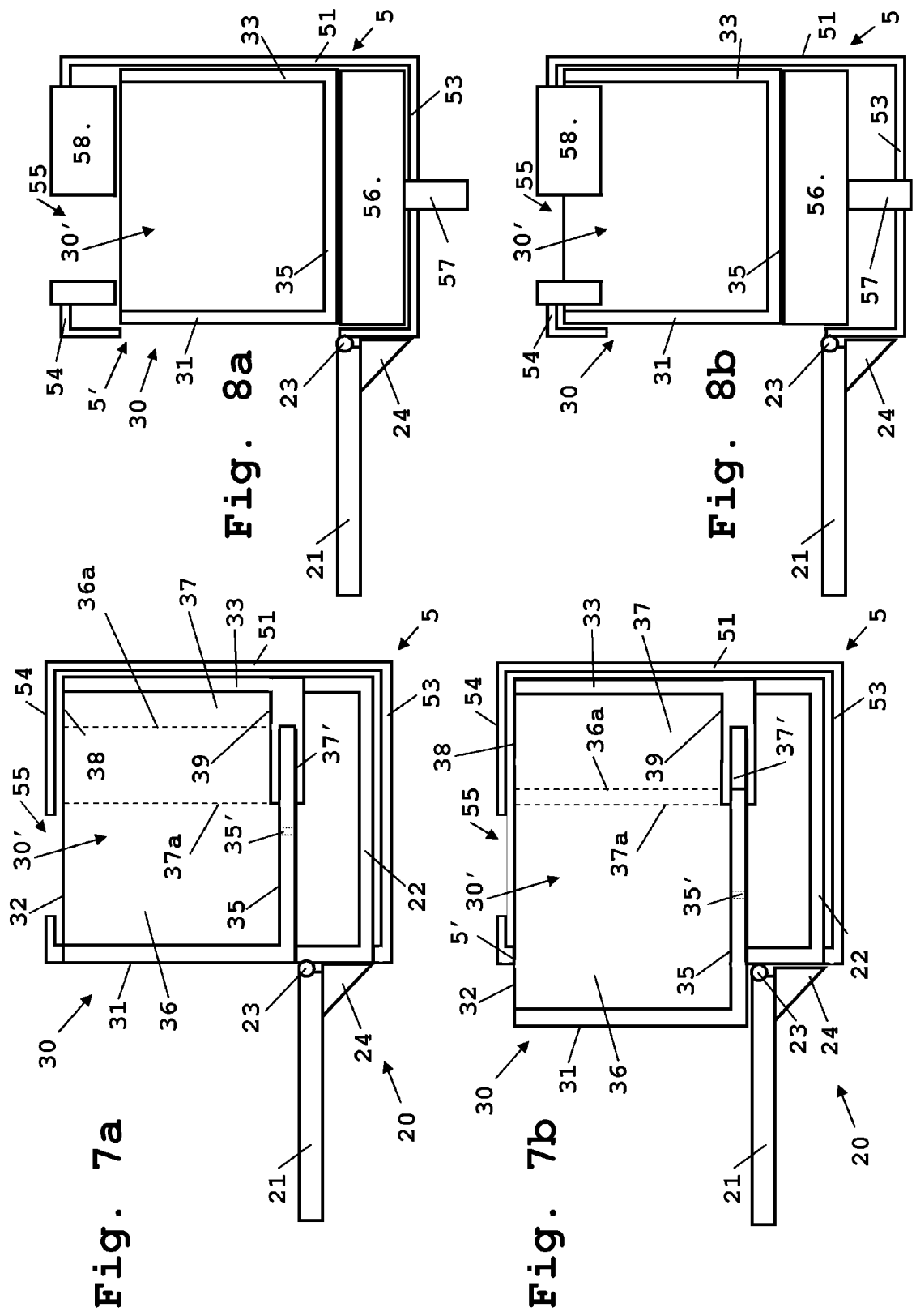

USED CAPSULE OR POD RECEPTACLE FOR LIQUID FOOD OR BEVERAGE MACHINES

This application is a 371 filing of International Patent Application PCT/EP2008/067083 filed Dec. 9, 2008.

FIELD OF THE INVENTION

The field of the invention pertains to used capsule or pod receptacles of machines for preparing liquid food or beverages from an ingredient of the liquid food or beverage supplied within a capsule or pod to the machine.

BACKGROUND ART

Liquid food or beverage preparation machines are becoming very popular whether at home or in offices. For instance, there are machines for the preparation of beverages such as coffee, tea, soup or other similar beverages, in which at least one ingredient of the desired beverage, for example ground coffee, is supplied within a capsule or pod into a capsule or pod extraction chamber of the machine.

The use of capsules or pods, such as plastic and/or aluminium-based capsules or pods for the preparation of beverages has many advantages. Capsules or pods, in particular aluminium-based capsules or pods, are hermetic or gas tight and thus can protect the beverage ingredient effectively during an extended period of time against the environment such as air, humidity or light, before use of the ingredient. Thus such capsules and pods prevent premature degradation of the ingredient. Furthermore, capsules or pods of a beverage ingredient are easy to handle, hygienic, and their use involves less cleaning of the beverage preparation machine, in particular no significant part of the machine's extraction chamber comes into contact with the beverage ingredient contained in the capsule or pod during the extraction process.

Capsules or pods are usually inserted individually into the machine's extraction chamber, manually or automatically from a capsule or pod stack. Hot or cold water is then passed through the capsule or pod for brewing or otherwise extracting the ingredient(s) contained within the capsule or pod and form the desired beverage. The prepared beverage is supplied via an outlet of the machine into a cup, mug or other receptacle to the user.

Used capsules or pods may either be removed individually from the liquid food or beverage preparation machine after each preparation cycle or they may be collected in a machine's used capsule or pod receptacle for instance as mentioned in EP 1 731 065.

Typically, the capsule or pod receptacle is located underneath the capsule or pod chamber so that the capsules or pods may fall by gravity into the receptacle upon extraction. In the latter case, the receptacle has to be emptied by the user when full. The receptacle may be a drawer-type removable receptacle located in a seat of the beverage preparation machine typically under the extraction chamber. The used capsule or pod receptacle may be slid in and out of the machine's housing.

A problem may arise with such capsule or pod receptacles, in particular in conjunction with rigid capsules or pods, when used capsules or pods accumulate in the receptacle to form a heap of capsules or pods whose top extends above the receptacle in such a manner to come into conflict with the housing when the receptacle is slid out of the machine's housing for emptying.

A solution to avoid the jamming of the receptacle by used capsules or pods is to provide an optical level detector for measuring the level of capsules or pods in the used capsule or pod receptacle and inviting the user to empty the receptacle when the level of capsules or pods comes close to the level of the machine's housing. Another solution involves counting the number of capsule or pod extractions after emptying the receptacle and inviting the user to empty the receptacle after a predetermined number of capsules or pods has been collected, an excess of which may possibly cause jamming.

A drawback with the level detector system involves the use of expensive electronic detectors, in particular optical detectors. Furthermore, since the accumulated capsules or pods naturally form a heap in the receptacle a waste of space is usually also involved around this heap. A drawback of the capsule or pod counting system lies in the fact that, in order to avoid jamming at all time, it is necessary to set a maximum number of collectible capsules or pods in the receptacle that will often lead to a poor filling of the receptacle at the time when the user will be invited to re-empty the receptacle and to an even greater waste of space around the heap of collected capsules or pods in the receptacle than with the above described level detector.

Hence, there is still a need to provide an inexpensive simple solution for avoiding jamming of a used capsule or pod receptacle in a liquid food or beverage machine.

SUMMARY OF THE INVENTION

The invention thus relates to a machine for preparing a liquid food or beverage from a pre-portioned beverage or food ingredient in a capsule or pod.

For instance, the machine is a coffee, tea or soup preparation machine. In particular, the machine is arranged for preparing within a liquid food or beverage module a beverage or liquid food by passing hot or cold water or another liquid through a capsule or pod containing an ingredient of the beverage or liquid food to be prepared, such as ground coffee or tea or chocolate or cacao or milk powder.

In a broad aspect of the invention, the preparation machine comprises: a liquid food or beverage preparation unit arranged to receive capsules or pods for use and evacuate capsules or pods upon use; a housing having an opening leading into a seat to which capsules or pods are evacuated from the preparation unit; and a receptacle having a cavity forming a storage space for collecting capsules or pods evacuated to the seat into the receptacle to a level of fill. The receptacle is insertable into the seat for collecting capsules or pods and is removable from the seat for emptying the collected capsules or pods.

In accordance with the invention, the preparation machine further comprises means to inhibit jamming of the receptacle at removal from the seat when the level of fill in the receptacle extends above the opening of the housing. In particular, the jamming inhibiting means are so arranged that the collected capsules or pods in the receptacle are inhibited from interfering with the housing at removal of the receptacle through the housing's opening.

The jamming inhibiting means may be arranged to: lower the level of fill of collected capsules or pods in the receptacle for its removal. For instance, the machine is associated with a mechanical means arranged to redistribute an accumulated heap of capsules or pods in the receptacle to improve occupation of the storage space with capsules or pods. Such means may include a vibration or shaking means of the receptacle or other means that lowers the level of such a heap. Other means arranged to lower the level of fill of collected capsules or pods in the receptacle for removal thereof are discussed below.

The jamming inhibiting means may be arranged to: displace the receptacle with its level of fill of collected capsules or pods. In one embodiment, the receptacle is associated with an elevator means that raises the receptacle in the seat into its operative position to collect capsules or pods and that lowers the receptacle in the seat for removal thereof through the opening of the housing so that capsules or pods that could accumulate to a level above the receptacle's mouth in the operative position of the receptacle would be lowered relative to an upper part of the housing opening in a removal step of the receptacle. In another embodiment, the jamming inhibiting means are arranged to reorient, in particular within the seat, the receptacle so that the level of fill is lowered relative to an upper par of the opening of the housing. Examples of such reorientations of the receptacle are disclosed in application EP 08155753.0 of which priority is claimed for the present application and the content of which is hereby incorporated by way of reference.

In a particular aspect of the invention, the preparation machine comprises: a liquid food or beverage preparation unit arranged to receive capsules or pods for use and evacuate capsules or pods upon use; a seat to which capsules or pods are evacuated from the preparation unit; and a receptacle having a cavity forming a storage space for collecting capsules or pods evacuated to the seat. The receptacle is insertable into the seat for collecting capsules or pods and is removable from the seat for emptying the collected capsules or pods. In accordance with the invention, the preparation machine further comprises a means for reducing the storage space of the receptacle at insertion into the seat and for increasing the storage space of the receptacle at removal from the seat.

As mentioned above, used capsules or pods that drop into the collection receptacle via the receptacle's mouth tend to accumulate in the form of a heap in the receptacle. This heap of capsules or pods may rise up to a level that exceeds to level of the receptacle's mouth.

If a state of the art capsule or pod collection arrangement is used, typically a drawer-type receptacle, pulling the receptacle out from the cavity will be inhibited by the top of the heap of capsules extending above the receptacle's opening, which top will collide with the fixed outer wall of the device's housing that more or less matches the upper edge of the front wall of the movable capsule receptacle. In such a situation, the receptacle will be jammed by the capsules in the cavity and the user will be faced with the problem of unjamming the receptacle.

The present invention provides a solution to this problem by reducing the capsule or pod storage space in the receptacle during collection of capsules or pods, and by increasing the available storage space when the receptacle is removed from the preparation machine for emptying the collected capsules or pods.

In one embodiment, the seat comprises or is assembled to a body that is arranged to:
  enter the cavity at insertion of the receptacle into the seat, whereby the storage space is reduced; and
  exit the cavity at removal of the receptacle from the seat, whereby the storage space is increased.

Typically, this body will be moulded or cast with the seat or will be mounted on an anchorage part integral with the seat.

For instance, the receptacle has a wall delimiting the cavity, the wall having a through-opening for allowing the passage of the body into the cavity. The body can be associated with: a rear face or rear end of the seat and may be arranged to extend via the through-opening of a rear wall of the receptacle; and/or a side face or side of the seat and is arranged to extend via the through-opening of a sidewall of the receptacle.

It is also contemplated to provide an elevator-type system to increase and reduce the storage space of the receptacle. For example, the seat may include an elevator platform that is arranged to raise the receptacle within the seat against a counter-body of the seat or lower it therefrom. In other words, the counter-body may be arranged to: enter the receptacle's mouth to reduce the receptacle's storage space when the receptacle is in its operative position to collect capsules or pods; and exit the receptacle's mouth to increase the receptacle's storage space when the receptacle is lowered from its operative position and removed from the seat. Alternatively, it is also possible to provide a counter-body that is lowered and raised into the receptacle's mouth to reduce and increase the receptacle's storage space. The elevator-type movements of the platform or of the counter-body can be manually or motor-driven.

In another embodiment, the receptacle comprises a plurality of walls delimiting the cavity, at least one of which being relatively movable in the receptacle to increase and reduce the storage space at removal and insertion of the receptacle, respectively. For instance, the cavity is delimited by two cooperating shells that are movable relatively to one another. The cooperating shells as well as the receptacle and the seat can be relatively and respectively movable to one another along substantially parallel directions. For example, at least one relatively movable wall, in particular a shell, of the receptacle is movable in a sliding or telescopic movement in the receptacle.

More generally, the receptacle can have a bottom with at least one arrangement, such as one or more through-openings or drain-holes, for the evacuation of liquid. The receptacle can be located on a reservoir for collecting liquid from the receptacle. The receptacle and the reservoir may be insertable into and removable from the seat en bloc.

Another aspect of the invention concerns a receptacle having a cavity forming a storage space for collecting capsules or pods. Such a receptacle can be insertable and removable from a seat of a machine for preparing liquid food or beverage that is arranged to evacuate ingredient capsules or pods to such a seat upon use, as described above. This receptacle comprises means associated with its cavity for reducing the storage space at insertion into such a seat and for increasing the storage space at removal from such a seat.

Such a receptacle may include any feature or combination of features disclosed in the relation with the receptacle of the liquid food or beverage preparation machine described above.

BRIEF DESCRIPTION OF THE DRAWINGS

The invention will now be described with reference to the schematic drawings, wherein:

FIG. 2 shows a similar machine with an exploded view of the its capsule or pod collection receptacle, cup or mug support and drip tray arrangement;

FIGS. 3a to 5a show a perspective view of a capsule or pod receptacle in various positions relatively to a corresponding seat of a liquid food or beverage preparation machine according to the invention;

FIGS. 3b to 5b show corresponding cross-sectional views of the receptacle and seat of FIGS. 3a to 3c;

FIG. 6 is a cross-sectional view from above of a front part of a receptacle of a preparation machine according to the invention;

FIGS. 7a and 7b illustrate two positions of another capsule or pod receptacle in a corresponding seat of a liquid food or beverage preparation machine according to the invention;

FIGS. 8a and 8b illustrate two positions of another capsule or pod receptacle in a corresponding seat of a liquid food or beverage preparation machine according to the invention;

DETAILED DESCRIPTION

Figure 1:
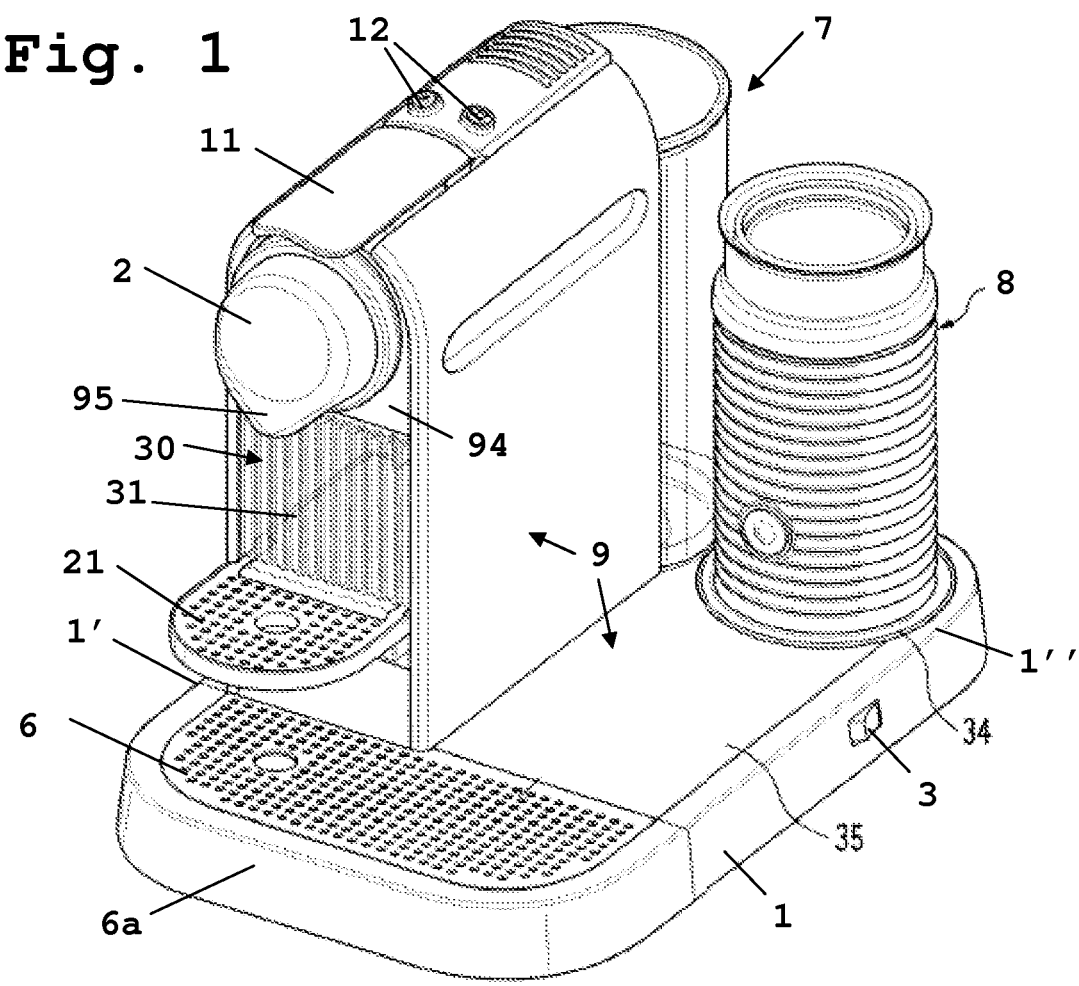
FIG. 1 illustrates a liquid food or beverage preparation machine according to the invention.

FIG. 1 shows a liquid food or beverage machine according to the invention. The machine has a liquid food or beverage unit 2 in a housing 9. Unit 2 is arranged for receiving an ingredient capsule or pod and feeding a liquid to the capsule or pod. Unit 2 is mounted on a platform 1 and extends along a lateral side 1' thereof. A beverage outlet 95 for dispensing beverage from unit 2 extends through a front face 94 of housing 9.

Unit 2 includes a brewing module (not shown) that comprises an opening and closure handle 11 and means for holding a substance-containing capsule or pod, e.g., a coffee capsule, and liquid food or beverage delivery means such as a liquid food or beverage duct 95. The holding means typically comprises a capsule holder and a brewing cage, a fluid injection system for injecting water in the capsule and a closure device such as a lever and a knee joint mechanism. Suitable extraction modules are described in EP 1 859 713. Further possible features of unit 2 are discussed in greater details in co-pending application EP07123009, the content of which is hereby incorporated by way of reference.

Furthermore, housing 9 houses within a receptacle seat a used capsule or pod receptacle 30 that has a front face 31 and that is removably inserted under the brewing unit and outlet 95, in accordance with the invention. Receptacle 30 and its seat in housing 9 will be discussed in greater details in relation with FIGS. 2 to 8b.

Platform 1 has at least the minimal functions as to the fluid and power management, which is supplying the liquid food or beverage unit 2 with electrical power and with water from water tank 7 attached to the base platform externally to housing 9 and adjacent to the rear wall of housing 9.

A master switch 3 is mounted on platform 1 for shutting on and off the machine. Two user-buttons 12, typically for selecting a small or large quantity of liquid food or beverage to be prepared, are located above unit 2.

Upper face 34 of platform 1 has means in the form of a STRIX™ connector (not shown) for connecting a milk frothing device 8. Such disconnectable connectors for the beverage or liquid food machine and frothing device 8 are for example disclosed in greater detail in WO 03/075629, WO 2008/046837 and in PCT/EP08/056349 which are hereby incorporated by way of reference.

Upper face 34 is adjacent neighbouring front face 35 that can be associated with a heating system, in particular integrated in platform 1, and that may be arranged to support one or more cups or mugs for pre-heating thereof prior to use.

As mentioned above, liquid food or beverage unit 2 generally extends upwards within housing 9 adjacent a first lateral edge 1' of platform 1. Frothing device 8 is generally located adjacent a second lateral edge of platform 1 opposite the first edge 1", so that housing 9 and platform 1 generally form in cross-section an L-shape that supports frothing device 8.

The liquid food or beverage machine also includes a support device 6 for supporting mugs that is located under beverage outlet 95 and that is in the shape of a perforated plate for evacuating liquid. A collector 6a in the form of a shallow reservoir is located underneath support device 6 for collecting the evacuated liquid. Collector 6a does not require a high capacity for collecting liquid. Most of the time, collector 6a will only have to collect drips and spills.

Support device 6 and collector 6a are separable en bloc from platform 1, for instance for emptying collector 6a and/or for cleaning.

Furthermore, the liquid food or beverage machine has, above support device 6, a second support plate 21 for supporting recipients, such as cups, of smaller size underneath the outlet 95. Like main support device 6, second support plate 21 comprises a perforated plate for the evacuation of liquid, in particular to collector 6a, optionally via support device 6. Second support plate 21 is movable into a generally horizontal operative position between the outlet 95 and support device 6, as illustrated, and is movable into a generally upright or vertical rest position away therefrom so that a larger recipient is placeable on support device 6 under outlet 95. Second support plate 21 is in particular rotatable and/or slidable from its operative position into its rest position. Further details of possible features of such second support device are for example disclosed in EP 1 867 260.

FIG. 2, in which the same numeric references generally designate the same elements, shows another embodiment of the invention.

The preparation machine shown in FIG. 2 has the same features as the machine of FIG. 1 except for the absence of the lateral platform extension supporting a milk frothing device.

The preparation machine of FIG. 2 has a seat 5 for receiving a receptacle 30 having a cavity 30' that forms a storage space for collecting used capsules or pods.

Receptacle 30 may be assembled to a cup support device 20 which includes cup support member 21 that is pivotally mounted onto a reservoir 22 supporting receptacle 30. Support member 21 is assembled to or integral with a stop member 24 that is rotatable with support member against a front face of reservoir 24 to stop the downward rotation of support member 21 and secure member 21 in a horizontal position.

Receptacle 30 may have bottom part with a drain-hole so that reservoir 22 can collect liquid drained from this bottom part into reservoir 22 via the drain-hole. Cup support device 20 and receptacle 30 resting thereon may be inserted and removed en bloc from seat 5. Further details of receptacle 30 and seat 5 are discussed in relation with FIGS. 3a to 5b.

Also shown in FIG. 2, collector 6a supporting support device 6 may be removably assembled via a mechanical connector 4 to platform 1.

FIGS. 3a to 5a and 3b to 5b show in perspective view and cross-sectional view, respectively, different positions of receptacle 30 relative to seat 5: an inserted position (FIGS. 3a and 3b); an intermediate position (FIGS. 4a and 4b) at insertion or removal; and a removed position (FIGS. 5a and 5b).

As can be seen in FIGS. 3a to 5b, the capsule or pod collection arrangement of a machine according to this embodiment of the invention includes three units, namely: a capsule or pod receptacle 30; a cup support device 20 on which receptacle 30 is mounted; and a seat 5 for housing receptacle 30 on cup support device 20.

Seat 5 is located within housing 9 underneath the brewing unit (with handle 11) of liquid food or beverage unit 2. Seat 5 has a bottom 53, a rear face 51, facing side faces 51' and a front opening 5' (see FIG. 5a) for allowing the insertion and the removal of receptacle 30 and reservoir 22.

Cup support device 20 comprises a perforated support plate 21 that is hingedly assembled to liquid collection reservoir 22 via axis 23. Collection reservoir 22 has a rim that supports and holds capsule or pod receptacle 30, so that reservoir 22 and receptacle 30 can be inserted and removed from seat 5 en bloc.

Receptacle 30 has a generally funnel-shaped bottom 35 with a through-hole 35' for evacuating liquid, in particular from capsules or pods upon use or from a cleaning or rinsing process of the preparation machine, to reservoir 22 located underneath. Cavity 30' of receptacle 30 is generally delimited by bottom 35, front wall 31, facing sidewalls 32 and rear wall 33.

Receptacle 30 is so dimensioned that front wall 31 comes generally flush with front face 94 of housing 9 when receptacle 30 is in its operative position inserted in seat 5. Front wall 31 can be transparent or translucent to permit visual examination by a user of the level of fill of receptacle 30 with capsules or pods.

Moreover, as shown in greater details in FIG. 6, front wall 31 may have one or more through-openings 317 for the evacuation of steam from cavity 30' of receptacle 30, in particular a series of side-by-side elongated through-openings, such as through-openings 317 extending over substantially an entire height of front wall 31. In one embodiment, wall 31 may include two adjacent parallel lines 312,314 of generally vertically extending parallel and spaced apart side-by-side members 311,313. These two lines 312,314 of parallel upright members 311,313 can be offset so that the parallel members 311,313 of the two lines 312,314 are in a staggered arrangement, in a zig-zag order, or in positions alternating on either side of a median line 316 extending between the two lines 312,314. The two lines 312,314 of parallel upright members 311,313 may extend between end portions 315 of sidewalls 32 of receptacle 30.

In this configuration, the spaced apart upright parallel members 311,313 may delimit therebetween through-openings 317. In such an arrangement, through-openings 317 have a flow-through orientation that is parallel to the general direction 316 of front wall 31. Hence, steam or fluid will not be able to project in direct line from cavity 30' outside but will be diverted the staggered arrangement 311,313.

In accordance with the invention, the liquid food or beverage preparation machine further comprises a means for reducing the storage space of receptacle 30 at insertion into seat 5 and for increasing the storage space of receptacle 30 at removal from the seat 5.

In the embodiment shown in FIGS. 3a to 5b, such means are provided, on the one hand, in the form of a through-opening 34 delimited by rear wall 33 or receptacle 30 and, on the other hand, by a body 52 protruding out from rear wall 51 or seat 5. Through-opening 34 and body 52 cooperate so that: when receptacle 30 is inserted in seat 5, body 52 extends via through-opening 34 into cavity 30' of receptacle 30 whereby the storage space of cavity 30' is reduced by the corresponding intruding volume of body 52, as illustrated in FIGS. 3a and 3b; when receptacle 30 is removed from seat 5, the volume previously occupied by body 52 in cavity 30' is freed, whereby the storage space of cavity 30' is increased in the absence of body 52 in cavity 30', as illustrated in FIGS. 5a and 5b. During removal or insertion of receptacle 30, body 52 retracts from or penetrates into cavity 30' via through-opening 34 of rear wall 33, as shown in FIGS. 4a and 4b.

Hence, when cavity 30' is filled or even overfilled with capsules or pods, a user may still remove receptacle 30 from seat 5 without risk of jamming receptacle 30, as the removal operation increases the available storage space of receptacle 30. As explained above, during removal, body 52 withdraws from cavity 30' leaving additional space therein. Conversely, when receptacle 30 is put back into place in seat 5 upon emptying, body 52 may freely enter empty cavity 30' to reduce its storage capacity for the capsule or pod filling process.

Figure 9A:
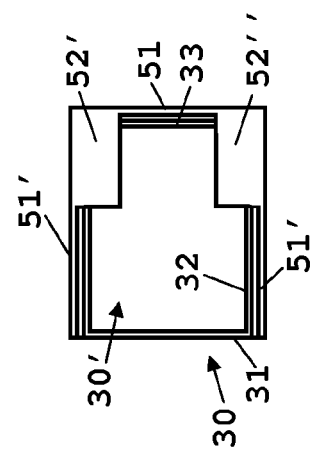
FIGS. 9a and 9b illustrate a variation of the receptacle and corresponding seat of FIGS. 3a to 5b.
Figure 9B:
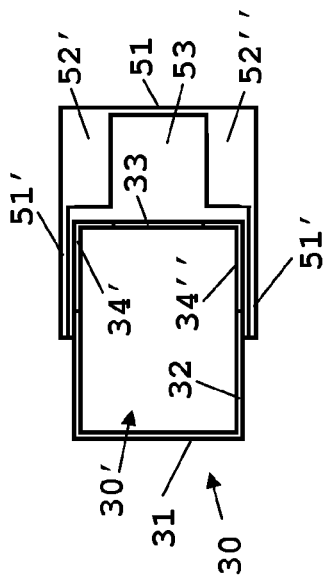

FIGS. 9a and 9b, in which the same numeric references generally designate the same elements, show two schematic views from above of a variation of the receptacle and seat shown in FIGS. 3a to 5b. FIG. 9a illustrates receptacle 30 in its operative position for collecting capsules or pods. FIG. 9b illustrates receptacle 30 in an intermediate position at removal (or insertion) into seat 5 of the preparation machine.

Instead of having a body of a seat that enters via a through-opening in a middle part of the rear wall of the receptacle like in FIGS. 3a to 5b, in FIGS. 9a and 9b seat 5 has a pair of spaced apart bodies 52',52" that are located at opposite end corners of seat 5 and that are arranged to enter laterally into cavity 30' via cut-outs or through-openings 34',34" formed at rear corners between sidewalls 32 and rear wall 33.

Likewise, through-opening 34',34" and bodies 52',52" cooperate so that: when receptacle 30 is inserted in seat 5, bodies 52',52" extend laterally via corresponding through-openings 34',34" into cavity 30' of receptacle 30 whereby the storage space of cavity 30' is reduced by the corresponding intruding volumes of bodies 52',52", as illustrated in FIG. 9a; when receptacle 30 is removed from seat 5, the volumes previously occupied by bodies 52',52" in cavity 30' are freed, whereby the storage space of cavity 30' is increased in the absence of bodies 52',52" in cavity 30', as illustrated in FIG. 9b. During removal or insertion of receptacle 30, bodies 52', 52" retract from or penetrate into cavity 30' via through-openings 34',34" of sidewalls 32 and rear wall.

FIGS. 7a and 7b, in which the same numeric references generally designate the same elements, schematically illustrate a further embodiment of receptacle 30 and seat 5 of a liquid food or beverage preparation machine according to the invention. FIG. 7a illustrates receptacle 30 in its operative position in seat 5. FIG. 7b illustrates receptacle 30 during insertion into or removal from seat 5.

In this embodiment, the means for reducing the storage space of receptacle 30 at insertion into seat 5 and for increasing the storage space of receptacle 30 at removal from the seat 5 include a pair of facing shells 36,37 delimiting cavity 30' of receptacle 30. Shells 36,37 are movable relatively to one another to increase and decrease the storage space of cavity 30'. In particular, shells 36,37 are in a telescopic arrangement. Peripheral portions 36a of walls 32 and bottom 35 of shell 36 may slide in an out from grooves 37' in corresponding peripheral portions 37a of walls 38 and bottom 39 of shell 37. To avoid unwanted full separation of shells 36,37, groove 37' and/or peripheral portions 36a may incorporate an abutment or like arrangement (not shown), as known in the art.

During use, used capsules or pods are evacuated from a brewing unit to passage 55 of seat 5 into cavity 30' of receptacle 30. In this operative configuration, receptacle 30 has its shells 36,37 urged together for reducing the storage space of cavity 30', as illustrated in FIG. 7a.

When receptacle 30 needs to be removed from seat 5, e.g. for emptying, front shell 36 may first be pulled out, e.g. telescoped out, for instance by means of a handle or grip (not shown), while leaving rear shell 37 in place in seat 5 with rear walls 33,51 of receptacle 30 and seat 5 remaining together, as illustrated in FIG. 7b. Hence, the size of cavity 30' of receptacle 30 is correspondingly increased and capsules or pods collected therein have an increased storage space in receptacle 30. It follows that capsules or pods that would have been accumulated above the mouth of receptacle 30, in particular up to and into passage 55, so as to overfill receptacle 30 in its operating position, are redistributed in the enlarged cavity 30' having a larger storage space. Such an arrangement significantly reduces the risk of clogging or jamming of capsule or pod collection receptacles at removal. When capsules or pods stored in enlarged cavity 30' have freed the way out, receptacle 30 may be further pulled along the same direction to remove receptacle 30 including rear shell 37 entirely from seat 5.

As apparent from FIGS. 7a and 7b, pivotable support plate 21 should be in its deployed operative horizontal position when receptacle 30 is being removed from or inserted into seat 5. Furthermore, reservoir 22 holding receptacle 30 may follow rear shell 37 and have a corresponding shape to allow relative movements in seat 5 of front shell 37 on reservoir 22.

In a variation, it is of course possible to arrange the receptacle and the reservoir so that the reservoir follows the receptacle's front shell. In a second variation, it is also possible to arrange the receptacle and the reservoir so that the reservoir follows the receptacle's front shell at insertion of the receptacle into the seat and so that the reservoir follows the receptacle's rear shell at removal of the receptacle from the seat, or vice versa.

FIGS. 8a and 8b, in which the same numeric references generally designate the same elements, schematically illustrate a further embodiment of receptacle 30 and seat 5 of a liquid food or beverage preparation machine according to the invention. FIG. 7a illustrates receptacle 30 during insertion into or removal from seat 5. FIG. 7b illustrates receptacle 30 in its operative position in seat 5.

In this embodiment, the means for reducing the storage space of receptacle 30 at insertion into seat 5 and for increasing the storage space of receptacle 30 at removal from the seat 5 include an elevator like platform 56 and a counter-body 58 in seat 5.

Elevator-like platform 56 is movable up and down by means of drive rod 57. Platform 56 is arranged to support bottom 35 of receptacle 30 and move receptacle 30 up and down between bottom 53 and top 54 of seat 5. Furthermore, seat 5 has a counter-body 58 that is arranged to reduce the storage space of cavity 30' when receptacle 30 is in its operative position to collect pods or capsules.

This operative position of receptacle 30 is illustrated in FIG. 8b. In this position, receptacle 30 is lifted by platform 56 against top 54 so that counter-body 58 enters into receptacle 30 via its mouth for reducing the storage space of cavity 30'. Capsules or pods may be evacuated from the brewing unit into cavity 30' via passage 55 in counter-body 58.

When receptacle 30 is full or overfilled with capsules or pods, in particular accumulated up into passage 55, platform 56 with receptacle 30 may be lowered as illustrated in FIG. 8a. In this lower position, the top surface of platform 56 which contacts bottom 35 of receptacle 30, comes generally flush with the top surface of support plate 21 when in its deployed horizontal operative position. Hence top surfaces of platform 56 and of support plate 21 provide one substantially continuous guide surface for moving receptacle 30 in and out from seat 5. Moreover, the upper space or cavity 30' previously occupied by counter-body 58, is freed and the capsules or pods in excess may occupy this newly freed space so as to reduce or eliminate the risk or clogging or jamming receptacle 30 when pulled out of seat 5 via opening 5'.

Unlike the previous embodiments, the receptacle and seat schematically shown in FIGS. 8a and 8b are not associated with a separated reservoir for collecting liquid and the receptacle is not provide with a drain-hole for evacuating such liquid to the reservoir. In this embodiment, such liquid is directly collected and accumulated on the bottom of the receptacle. Furthermore, the pivotable support plate 21 is directly pivotally mounted via axis 23 on seat 5 (or on the housing of the preparation machine). Support plate 21 is connected to a stop member 24 that is pivotable with support plate 21 against seat 21 (or against the housing of the preparation machine) to hold and secure support plate 21 in a substantially horizontal operative position. Support plate 21 may also be pivoted upwards in an upright rest position to cover opening 5'.

In a variation, it is also possible to move the counter-body up and down in the cavity of the receptacle so as to increase and decrease its storage space, instead or moving the entire receptacle up and down by means of the platform. In a further variation, it is also possible to provide a reservoir for supporting the receptacle like in the previous embodiments. In such a case, the reservoir and the receptacle resting thereon may be lifted or lowered together by the elevator-like platform. Alternatively, the counter-body may be lowered and raised in the receptacle.

In either case, whether the counter-body is lowered into the receptacle or whether the receptacle is lifted so that the counter-body enters the receptacle's mouth, the receptacle is safely secured in its operative position within the seat and does not risk to come out or fall out inadvertently.

Figure 10A:
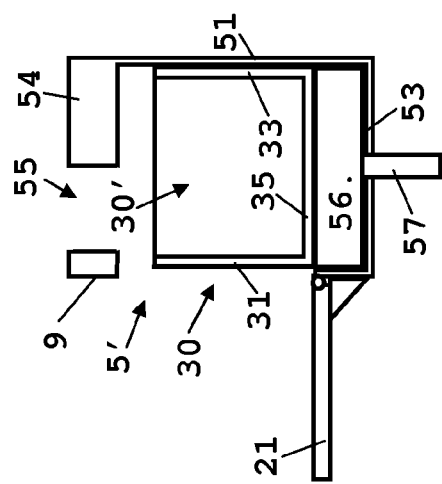
FIGS. 10a and 10b illustrate a variation of the receptacle and corresponding seat of FIGS. 8a and 8b.
Figure 10B:
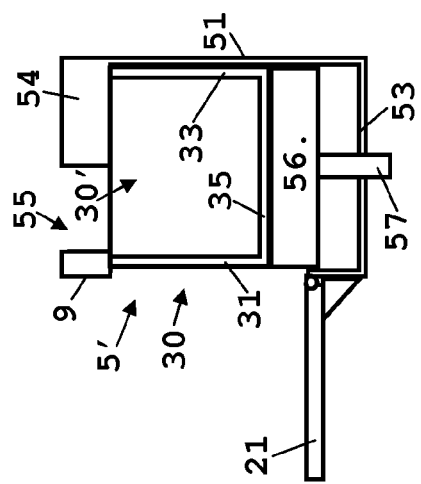

A further elevator-type variation is shown in FIGS. 10a and 10b, in which the same numeric references generally designate the same elements, where no counter-body is arranged to enter into the cavity 30' of receptacle 30. In this embodiment, the jamming inhibiting means do not affect the storage space of receptacle 30.

If FIGS. 10a and 10b, elevator-like platform 56 is movable up and down by means of drive rod 57. Platform 56 is arranged to support bottom 35 of receptacle 30 and move receptacle 30 up and down between bottom 53 and top 54 of seat 5. Platform 56 is arranged to hold receptacle in its operative position against top 54 (FIG. 10b) and lower receptacle 30 for removal (FIG. 10a).

In the operating position, receptacle 30 capsules or pods may be evacuated from the brewing unit into cavity 30' via passage 55.

When receptacle 30 is full or overfilled with capsules or pods, in particular accumulated up into passage 55, platform 56 with receptacle 30 may be lowered as illustrated in FIG. 10a. In this lower position, remaining used capsules or pods may come down from passage 55 to unclog receptacle 30, whereby receptacle 30 may be pulled out from seat 5 without having capsules or pods interfering with an upper part of opening 5' of the machine's housing.

Figure 11A:
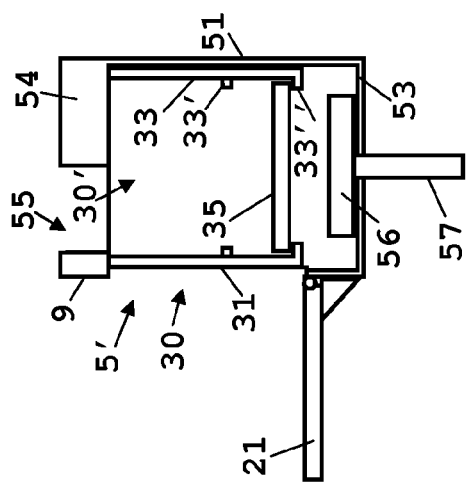
FIGS. 11a and 11b illustrate a further variation of the receptacle and corresponding seat of FIGS. 8a and 8b.
Figure 11B:
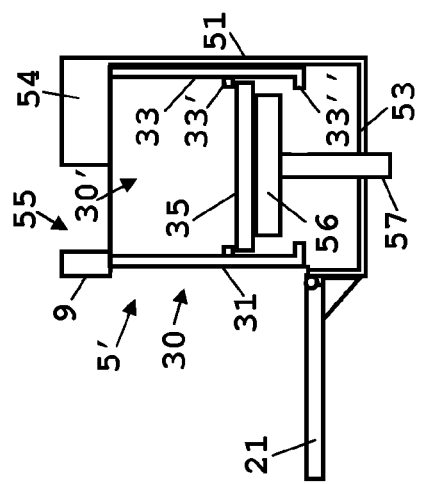

Yet another elevator-type variation is schematically illustrated in FIGS. 11a and 11b, in which the same numeric references generally designate the same elements.

In this embodiment, bottom 35 of receptacle 30 is movable up and down within a bottom part of receptacle 30 to reduce and increase, respectively the storage space of cavity 30'. As illustrated, bottom 35 may be raised and lowered by elevator platform 56 between abutments 33' and bottom flanges 33" protruding from rear wall 33 and front wall 31 of receptacle 30.

In a variation, it is also possible to replace the elevator-type raising and lowering mechanism by a cam and follower arrangement or another movement conversion system from a horizontal insertion movement of the receptacle into a vertical elevation movement of the bottom of the receptacle, and from a horizontal removal movement of the receptacle into a vertical lowering movement of the bottom of the receptacle.

For instance, the movable bottom of the receptacle may include horizontally extending cam followers that protrude beyond the receptacle's sidewalls in a manner to allow vertical movements of the cam followers. Moreover, the sidewalls of the seat have corresponding cams in which or against which the cam followers engage when the receptacle is moved horizontally into the seat, the cams being arranged so as to guide the cam followers upwards as the receptacle is introduced into the seat and downwards when the receptacle is removed from the seat.

What is claimed is:

1. A machine for preparing liquid food or beverage from a beverage or food ingredient contained in a capsule or pod, comprising:
   a liquid food or beverage preparation unit arranged to receive capsules or pods for use and evacuate capsules or pods after use;
   a housing having an opening leading into a seat to which capsules or pods are evacuated from the preparation unit;
   a receptacle having a cavity forming a storage space for collecting capsules or pods evacuated to the seat into the receptacle to a level of fill, the receptacle being insertable into the seat for collecting capsules or pods and being removable from the seat for emptying the collected capsules or pods, and
   means to inhibit jamming of the receptacle at removal from the seat when the level of fill in the receptacle extends above the opening of the housing, the jamming inhibiting means being arranged to lower the level of fill of collected capsules or pods in the receptacle; or to displace the receptacle with its level of fill of collected capsules or pods, so that the collected capsules or pods in the receptacle are inhibited from interfering with the housing at removal of the receptacle through the housing's opening.

2. The machine of claim 1, wherein the jamming inhibiting means are arranged to lower, within the seat, the receptacle relative to an upper part of the opening of the housing.

3. The machine of claim 1, wherein the jamming inhibiting means are arranged to reorient, within the seat, the receptacle so that the level of fill is lowered relative to an upper par of the opening of the housing.

4. A machine for preparing liquid food or beverage from a beverage or food ingredient contained in a capsule or pod, comprising:
   a liquid food or beverage preparation unit arranged to receive capsules or pods for use and evacuate capsules or pods upon use;
   a seat to which capsules or pods are evacuated from the preparation unit;
   a receptacle having a cavity forming a storage space for collecting capsules or pods evacuated to the seat, the receptacle being insertable into the seat for collecting capsules or pods and being removable from the seat for emptying the collected capsules or pods; and
   means for reducing the storage space of the receptacle at insertion into the seat and for increasing the storage space of the receptacle at removal from the seat, wherein increasing the storage space includes lowering a level of fill of collected capsules or pods in the receptacle during removal of the receptacle.

5. The machine of claim 4, wherein the seat comprises or is assembled to a body that is arranged to enter the cavity at insertion of the receptacle into the seat, whereby the storage space is reduced; and to exit the cavity at removal of the receptacle from the seat, whereby the machine has increased storage space based on this arrangement.

6. The machine of claim 4, wherein the receptacle has a wall delimiting the cavity, the wall having a through-opening for allowing the passage of the body into the cavity.

7. The machine of claim 6, wherein the body is associated with a rear face or end of the seat and is arranged to extend via the through-opening of a rear wall of the receptacle.

8. The machine of claim 6, wherein the body is associated with a rear face or end of the seat and is arranged to extend via the through-opening of a sidewall of the receptacle.

9. The machine of claim 4, wherein the receptacle has an upper mouth above the cavity arranged to allow the passage of the body into the cavity, optionally with the receptacle arranged to be raised against and around the body and lowered therefrom or with the body arranged to be lowered into the receptacle and raised out therefrom.

10. The machine of claim 4, wherein the receptacle comprises a plurality of walls delimiting the cavity, at least one of which is relatively movable in the receptacle to increase and reduce the storage space at removal and insertion of the receptacle, respectively.

11. The machine of claim 10, wherein the cavity is delimited by two cooperating shells that are movable relatively to one another, with the cooperating shells as well as the receptacle and the seat optionally relatively and respectively movable to one another along substantially parallel directions.

12. The machine of claim 10, wherein the at least one relatively movable wall is movable in a sliding or telescopic movement in the receptacle.

13. The machine of claim 1, wherein the receptacle has a bottom with at least one arrangement for evacuating liquid, with the receptacle being located on a reservoir for collecting liquid from the receptacle, and the receptacle and reservoir optionally insertable into and removable from the seat en bloc.

14. A receptacle having a cavity forming a storage space for collecting capsules or pods, such receptacle being insertable and removable from a seat of a machine for preparing a liquid food or beverage that is arranged to evacuate ingredient capsules or pods to the seat after use, wherein the receptacle comprises means associated with its cavity for reducing the storage space at insertion into the seat and for increasing the storage space at removal from the seat, wherein the increasing the storage space includes lowering a level of fill of collected capsules or pods.

15. The receptacle of claim 14, wherein the cavity is delimited by a wall having a through-opening allowing at insertion into the seat, entry into the cavity of a body associated with the seat; and at removal from the seat, exit from the cavity of the body.

16. The receptacle of claim 14, further comprising a plurality of walls delimiting the cavity, at least one of which is relatively movable in the receptacle to increase and reduce the storage space at removal and insertion of the receptacle in the seat, respectively.

17. The machine of claim 1 wherein the level of fill of collected capsules or pods is lowered in the receptacle by moving a wall that increases receptacle volume.

18. The machine of claim 4 wherein the level of fill of collected capsules or pods is lowered in the receptacle by moving a wall that increases receptacle volume.

19. The receptacle of claim 14 wherein the level of fill of collected capsules or pods is lowered in the receptacle by moving a wall that increases receptacle volume.

* * * * *